Nov. 1, 1938.   J. DICHTER   2,135,390
METHOD AND MACHINE FOR FITTING CLOSURES ON CONTAINERS
Filed March 25, 1935
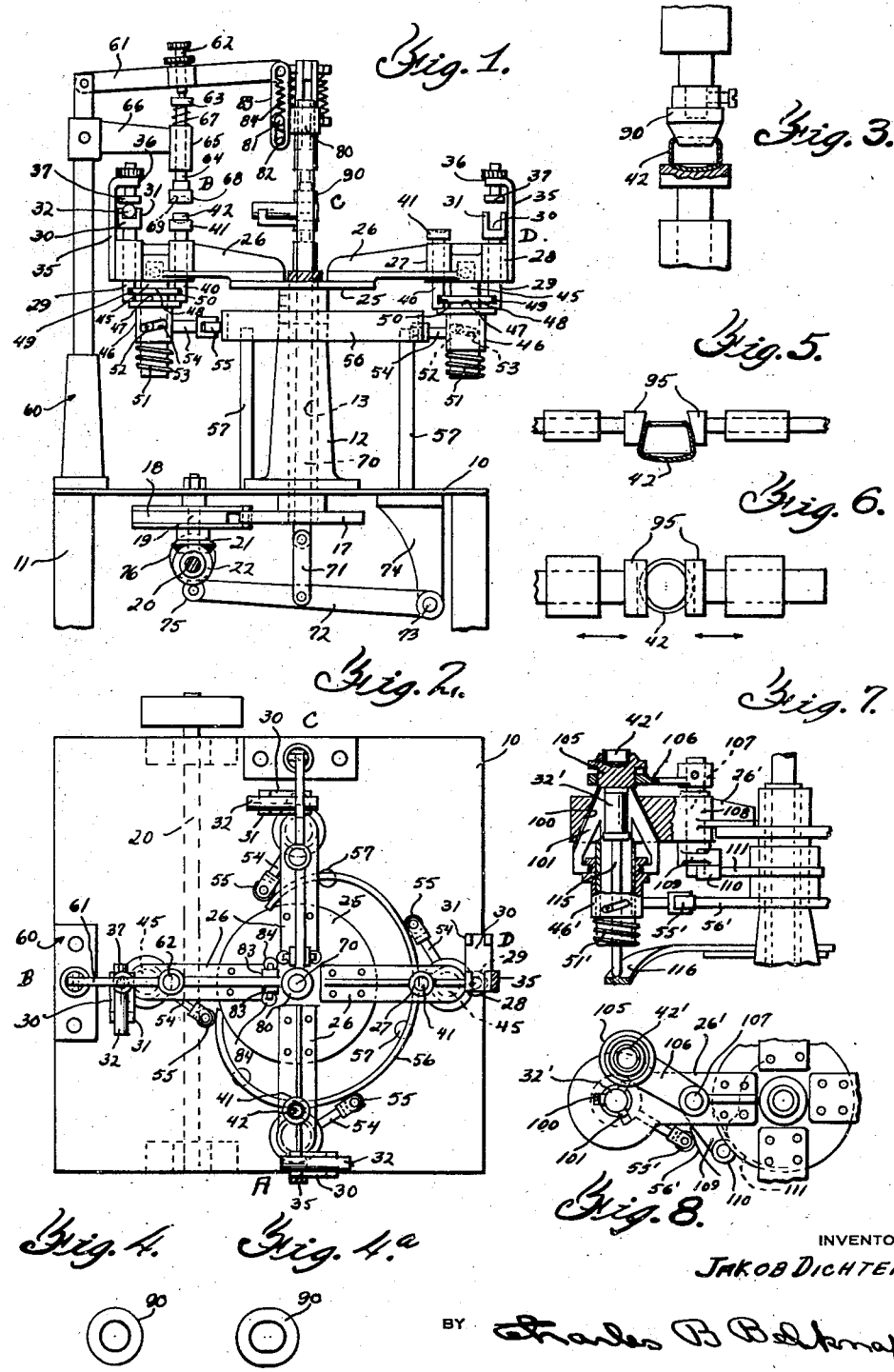
INVENTOR
JAKOB DICHTER
BY
ATTORNEY Patented Nov. 1, 1938

2,135,390

UNITED STATES PATENT OFFICE 2,135,390

METHOD AND MACHINE FOR FITTING CLOSURES ON CONTAINERS

Jakob Dichter, Berlin-Schoneburg, Germany

Application March 25, 1935, Serial No. 12,954
In Germany March 24, 1934

10 Claims. (Cl. 153—10)

(Granted under the provisions of sec. 14, act of
March 2, 1927; 357 O. G. 5)

This invention is directed to a method for sizing closures to containers on which they are to be fitted and to a machine by which the method may be practiced.

One of the primary objects of this invention is to provide a method of the above mentioned character by which closures such for example, as caps may be accurately sized so as to snugly engage the containers.

A further object of the invention is to provide a machine operable to shape a cap to cause the same to snugly engage a container to be closed.

Numerous other objects and advantages of this invention will become more apparent as the following description proceeds particularly when reference is had to the accompanying drawing wherein—

Fig. 1 is a semi-diagrammatic side elevational view of a machine constructed in accordance with the teachings of this invention;

Fig. 2 is a diagrammatic top plan view of the machine shown in Fig. 1;

Fig. 3 is a fragmentary elevational view of a portion of the mechanism adapted for association with the machine shown in Fig. 1;

Fig. 4 is an end elevational view of a portion of the structure shown in Fig. 3;

Fig. 4ᵃ is a view similar to Fig. 4 showing a slightly modified form which the element shown in Fig. 4 may assume;

Fig. 5 is a fragmentary side elevational view highly diagrammatic showing a slightly modified form of construction;

Fig. 6 is a top plan view of the structure shown in Fig. 5;

Fig. 7 is a fragmentary side elevational view partly in section of a further modified form of construction; and Fig. 8 is a diagrammatic top plan view of the structure shown in Fig. 7.

For the sake of convenience, the invention will be described as being incorporated in a method and machine for bending the rims of metal caps to cause the same to firmly grip the open ends of glass vials. In its broader aspects however, it will be apparent that the inventive principles may be incorporated in methods and machines for shaping other types of closures for use with other types of containers.

In its preferred form the method consists broadly in bending the rim of a metal cap to the size desired and then in the event that the cap is to be applied to a vial circular in cross section, in pressing the rim into somewhat of an oval shape so that the rim will grip the vial. Additionally, the method may include the steps of first bending the rim of the cap to a diameter smaller than that required and in then slightly widening the cap to the diameter of the glass vial to be closed.

The method will be more apparent when reference is had to the accompanying drawing in which the numeral 10 designates a base plate suitably supported on legs or the like 11. Carried by the base plate and projecting upwardly therefrom is a hollow standard 12 which provides a bearing for a tubular shaft 13.

For rotating the shaft 13 which a step by step movement, there is secured to the lower end of the shaft below the plate 10 a Geneva gear 17 and this gear is arranged to be driven by a driving member 18 carried on a shaft 19. This shaft is driven from a main shaft 20 by suitable bevel gears 21 and 22.

Fixed to the upper end of the shaft 13 for rotation therewith is a head 25 which carries four radially extending and equally spaced arms 26. Each arm carries at its outer end spaced bearings 27 and 28. Mounted for vertical reciprocation in each bearing 28 is a stem or plunger 29 which carries at its upper end a plate 30 having upstanding lugs 31 at its ends so as to support a length of glass tubing or a vial 32.

Fixed to each bearing 28 and projecting above the same is a bracket 35. At its upper end this bracket is provided with the inturned end 36 which overlies the plate 30 as clearly illustrated in Fig. 1 of the drawing. Mounted for vertical adjustment in the end 36 of the bracket is a plate 37 adapted to engage the vial 32 as will hereinafter be more fully brought out.

Mounted for vertical reciprocation in bearing 27 is a stem or plunger 40 and carried by the upper end of this plunger is head 41 recessed to receive a cap 42.

Depending from the end of each arm 26 and between bearings 27 and 28 is a rod 45 and sleeved on this rod is a sleeve 46. This sleeve is provided at its upper end with an annular groove 47 to provide a flange 48 which engages the grooves 49 and 50 carried by the stems 29 and 40 respectively.

The sleeve 46 is normally urged upwardly by a spring 51 which engages the lower end of the sleeve and is secured to the guide rod. For moving the sleeve downwardly against the force of spring 51, there is provided a pin 52 which is fixed to the rod 45 and which engages an upwardly inclined slot 53 formed in the sleeve. An arm 54 is secured to sleeve 46 and carries at its end a cam roller 55 adapted for engagement with a cam 56 suitably supported by legs 57 from the base plate 10.

It will be apparent by reference to Figs. 1 and 2 that when a roller 55 engages cam 56, the sleeve to which this roller is connected will be rotated in such a direction that the pin 52 working in slot 53 will cause downward movement of the sleeve against the force exerted by spring 51. When, however, the roller passes out of engagement with cam 56, the spring 51 will force the sleeve upwardly and the sleeve in turn will force the stems 29 and 40 upwardly.

It will be understood that in the operation of the machine each arm will be moved to a plurality of stations, there being in this case four arms and therefore four stations. The stations are identified in Fig. 2 of the drawing by reference characters A, B, C, and D. At Station A the glass vial or the like 32 will be placed on its support 30 while a cap 42 will be placed on its support 41. The Geneva gear obviously effects a rotation of the shaft 13 with a step by step movement and therefore the first step movement carries the vial and cap to Station B. As the arm reaches Station B, the roller 55 moves out of engagement with cam 56 permitting spring 51 to urge the sleeve upwardly and to thus move the cap and vial upwardly until the vial engages the plate 37 as clearly illustrated in Fig. 1 of the drawing. It will thus be apparent that the diameter of the vial determines the upward movement of the vial and cap under the force of spring 51. It will further be apparent that since the cap and vial move upwardly together, the cap will be moved up a distance depending directly on the diameter of the vial.

At Station B means is provided for bending in the rim of the cap to the desired diameter and to accomplish this there is provided the following structure.

Carried by the base plate 10 and projecting upwardly therefrom, is a standard 60. Pivotally secured to the upper end of this standard is an arm 61 which carries intermediate its ends an adjustable screw 62 which is arranged to engage the upper end 63 of a plunger 64 which is mounted for vertical reciprocation in a bearing 65 secured to an arm 66 which is fixed to the standard 60.

A spring 67 normally urges plunger 64 upwardly while the lower end of this plunger carries a tool 68 conically bored as at 69 to engage the rim of a cap 42 carried by the support 41.

For actuating the arm 61 there is provided a shaft 70 mounted for vertical reciprocation in the bore of shaft 13. At its lower end shaft 70 is connected by link 71 to an arm 72 pivotally mounted as at 73 on a bracket 74. The free end of arm 72 carries a roller 75 which engages cam 76 fixed to shaft 20.

At its upper end shaft 70 carries a head 80 to which is secured a pin 81 which engages in slot 82 formed in the ends of links 83 pivotally secured to the free end of lever 61. Springs 84 connect lever 61 to pin 81 with the result that when shaft 70 is forced downwardly by cam 76 lever 61 is likewise pulled downwardly. Springs 84 secured as they are to the head 80 and to the end of lever 61 act to maintain shaft 70 in its uppermost position.

It will be obvious that screw 62 may be so adjusted that upon downward movement of lever 61 by shaft 70 tool 68 will be moved downwardly a definite amount. These elements are so adjusted that the tool will contract the rim of the cap to the extent desired as compared to the diameter of the vial supported by head 30. It will be obvious that the smaller the vial the higher the cap will be elevated and the more the rim will be pressed inwardly. Thus the inward pressing of the rim is directly dependent upon the size of the vial carried by head 30.

If desired, the cap may at Station B be shaped or pressed into the size desired. As previously mentioned however, it is contemplated that the cap will be pressed inwardly to such an extent that it will be narrower than the diameter of the vial and that at Station C the cap will then be slightly widened so that it will accurately fit the vial.

To accomplish this there is provided at Station C an arm and mechanism similar to the arm 61 at Station B. Instead however, of actuating a tool 68 as at Station B, the arm at Station C actuates a tool 90 which, as illustrated, in Fig. 3 of the drawing, is a conical plug-like member adapted to be forced into the cap to slightly expand the rim thereof. This tool may be either circular in cross section as illustrated in Fig. 4 of the drawing or may be slightly oval as illustrated in Fig. 4a, since it has been found that if a slightly oval shape is imparted to the cap it will more firmly fit the vial.

Instead of imparting the slightly oval shape to the cap by means of a plug inserted in the cap as shown in Fig. 3, there may be provided cam members 95, which, as shown in Figs. 5 and 6 are adapted to engage opposite sides of the cap rim. It will be apparent that these members may be mounted for vertical reciprocation in a manner similar to tool 68 and thus in a manner similar to tool 90.

After the cap has been slightly widened and formed into a somewhat oval shape at Station C, the cap and vial are then moved to Station D by rotation of shaft 13. At Station D the cap and vial may be removed from the machine and the one fitted onto the other as will be apparent.

In Figs. 7 and 8 a slightly modified form of construction is illustrated. In this modified form of construction each arm 26' carries at its outer end tapered bearings 100 arranged to slidably receive movable paws 101. These jaws are connected at their lower ends to sleeve 46' adapted to be actuated in the same manner as sleeve 46 in the first described form of construction.

The jaws are adapted to grip the vial 32' and it will be apparent that as the jaws are moved upwardly by spring 51' they will be forced inwardly until they engage the vial 32'. Thus the upward movement of the jaws will be limited or regulated by the diameter of the vial.

Supported above the jaws 100 in a position to be engaged thereby, is a head 105 which constitutes a support for the cap 42'. This head is slidably mounted in an arm 106 which is secured to a stem 107 mounted for rotation in a bearing 108. An arm 109 secured to stem 107 carries a roller 110 which engages a cam 111 for swinging the head 105 into and out of alignment with the jaws, as illustrated in Fig. 8 of the drawing.

An adjustable support is provided for the vial this support comprising a plunger 115 which extends through sleeve 46' and is adapted at its lower end to ride on a cam 116.

In this modified arrangement it will be understood that at Station A the support 115 is lowered and the jaws are opened by virtue of the downward movement of sleeve 46'. The vial is then placed on the support in the manner illustrated and the vial is moved by actuation of the machine to Station B. It will be understood that at Station A the head 105 is swung out of alignment with the jaws to permit the insertion of the vial between the jaws.

As the vial reaches Station B, the roller 55' is moved out of engagement with cam 56' permitting an elevation of sleeve 46' by spring 51' and thus causing the jaws to be moved upwardly and forced inwardly into engagement with the vial. Obviously, the upward movement of the jaws will be limited or regulated by the diameter of the vial and additionally the upward movement of the jaws will force the head 105 upwardly so that the upward movement of the cap supported by the head will likewise be regulated by the diameter of the vial. The cap will thus be positioned so as to be properly acted on by the several tools previously described.

While in the machine illustrated, the tools have been shown as being relatively stationary, that is not rotating about the axis of the machine, it will be apparent that, if desired, a separate tool may be associated with each arm 26, the tools thus rotating with the arms so that a continuous operation of the machine is made possible.

While the invention has been described with some detail, it is to be understood that the description is for the purposes of illustration only and is not definitive of the limits of the inventive idea. The right is reserved to make such changes in the details of construction and arrangement of parts as will fall within a purview of the attached claims.

What I claim as my invention is:

1. In a machine for adjusting the size of a cap, means for supporting the cap to be adjusted, means adapted to engage the cap to adjust the size thereof, and means controlled by the size of the container to which the cap is to be fitted operable to vary the relative movement between the cap and the adjusting means following engagement of the latter with the former to thus regulate the degree of adjustment imparted to the cap by the adjusting means.

2. In a machine for adjusting the size of a cap, means for supporting the cap to be adjusted, a tool adapted to engage the cap to adjust the size thereof, means for effecting relative movement between the cap supporting means and the tool to cause the tool to engage the cap, the extent of the said relative movement determining the degree of adjustment imparted to the cap, and means for regulating the extent of relative movement between the tool and the cap supporting means.

3. In a machine for adjusting the size of a cap, means for supporting the cap to be adjusted, a tool adapted to engage the cap to adjust the size thereof, means for effecting relative movement between the cap supporting means and the tool to cause the tool to engage the cap, the extent of said relative movement determining the degree of adjustment imparted to the cap, and means controlled by the size of the container to which the cap is to be fitted for regulating the extent of relative movement between the tool and cap supporting means.

4. In a machine of the class described, means for supporting a cap the rim of which is to be adjusted to vary the size of the cap, means for supporting a container to which the cap is to be applied, a tool adapted to engage the container rim to press the same inwardly, means controlled by the size of the container for regulating the effective actuation of the tool on the cap, a second tool adapted to engage the cap rim to press the same outwardly, and means controlled by the size of the container for regulating the effective actuation of the second tool.

5. In a machine for adjusting the size of a closure in dependence upon the size of a container to which the closure is to be applied, a tool for adjusting the size of the closure, means for moving the closure to a position in spaced relation to the tool, the spaced relation of the closure from the tool being dependent upon the size of the container, and means for moving the tool into engagement with the closure to cause the tool to adjust the size of the closure, the initial spaced relation of the closure from the tool determining the size to which the closure is adjusted.

6. In a machine for adjusting the size of a closure in dependence upon the size of the container to which the closure is to be applied, a tool for adjusting the size of the closure, means for measuring the container to which the closure is to be applied, means for moving the closure to a position in spaced relation to the tool, the spaced relation of the closure from the tool being dependent upon the size of the container as predetermined by the said measuring means, and means for moving the tool into engagement with the closure to cause the same to adjust the size of the closure, the initial spaced relation of the closure from the tool determining the size to which the closure is adjusted.

7. In a machine for adjusting the size of a closure in dependence upon the size of a container to which the closure is to be applied, a tool for adjusting the size of the closure, means for moving the closure toward the tool, means for moving the container with the closure, means engaging the container for limiting movement of the container and closure so that the closure assumes a position spaced from the tool dependent upon the size of the container, and means for moving the tool into engagement with the closure to cause the same to adjust the size of the closure, the initial spaced relation of the closure from the tool determining the size to which the closure is adjusted.

8. In a machine for adjusting the size of a closure in dependence upon the size of a container to which the closure is to be applied, a tool for adjusting the size of the closure, means for moving the closure to a position in spaced relation to the tool, the spaced relation of the closure from the tool being dependent upon the size of the container, means for moving the tool into engagement with the closure to cause the same to adjust the size of the closure, and means for limiting the extent of movement of the tool whereby the initial spaced relation of the closure from the tool determines the size to which the closure is adjusted.

9. In a machine of the class described, means for moving a container and a closure to each of a plurality of stations, means for measuring the diameter of the container at one of said stations, a tool located at said station adapted to engage the closure to adjust the size of the same, additional means at said station for moving the closure into a position spaced from the tool dependent upon the diameter of the container as determined by the said measuring means, still further means at said station for moving said tool into engagement with the closure to cause the same to adjust the size of the closure, the initial spaced relation of the closure from the tool determining the size to which the closure is adjusted, and means at a second station controlled by the diameter of the container as determined by said measuring means for further adjusting the size of the closure.

10. The method of sizing a cap to a container which consists in moving a cap adjusting tool a definite distance along a predetermined path, positioning a cap to be adjusted in the path of movement of said tool so as to be acted on by the latter, the cap being spaced from the tool at the beginning of the movement of the latter, and varying the initial spaced relation between the tool and cap in dependence upon the size of the container to which the cap is to be fitted.

JAKOB DICHTER.